(12) United States Patent
Yang et al.

(10) Patent No.: US 11,368,890 B2
(45) Date of Patent: Jun. 21, 2022

(54) PREDICTING SMALL CELL CAPACITY AND COVERAGE TO FACILITATE OFFLOADING OF MACROCELL CAPACITY

(71) Applicant: AT&T Intellectual Property I, L.P., Atlanta, GA (US)

(72) Inventors: Yuning Yang, Basking Ridge, NJ (US); Wenjie Zhao, Princeton, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/916,998

(22) Filed: Jun. 30, 2020

(65) Prior Publication Data
US 2021/0410035 A1 Dec. 30, 2021

(51) Int. Cl.
*H04W 36/16* (2009.01)
*H04W 36/04* (2009.01)

(52) U.S. Cl.
CPC ........... *H04W 36/16* (2013.01); *H04W 36/04* (2013.01)

(58) Field of Classification Search
CPC ..... H04W 16/00; H04W 16/08; H04W 16/14; H04W 16/18; H04W 16/20; H04W 52/24; H04W 52/244; H04W 52/245; H04W 52/26; H04W 84/045; H04W 84/047; H04W 92/02; H04W 92/20
See application file for complete search history.

(56) References Cited

U.S. PATENT DOCUMENTS

| | | | | |
|---|---|---|---|---|
| 9,001,682 | B2* | 4/2015 | Kowali | H04W 88/18 370/252 |
| 10,477,426 | B1* | 11/2019 | Tiwari | H04W 16/18 |
| 2014/0141788 | A1* | 5/2014 | Puthenpura | H04W 16/18 455/449 |
| 2014/0153497 | A1* | 6/2014 | Brisebois | H04W 72/042 370/329 |
| 2015/0334576 | A1* | 11/2015 | Sofman | H04W 4/021 455/456.1 |
| 2017/0150365 | A1* | 5/2017 | Goswami | H04W 16/18 |
| 2018/0004905 | A1* | 1/2018 | Szeto | G16H 50/20 |

(Continued)

OTHER PUBLICATIONS

"Atoll Overview" Forsk. [https://www.forsk.com/atolloverview] retrieved Apr. 1, 2020, 4 pages.

*Primary Examiner* — Kan Yuen
(74) *Attorney, Agent, or Firm* — Amin, Turocy & Watson, LLP

(57) ABSTRACT

Predicting small cell capacity and coverage to facilitate offloading of macrocell capacity is presented herein. A system selects a group of candidate locations for placement of respective small cells to facilitate offloading, via the respective small cells, of traffic from respective macrocells corresponding to the candidate locations—the respective small cells including first transmission powers that are less than second transmission powers of the respective macrocells. Further, for each candidate location of the group of candidate locations, the system determines an estimated amount of traffic capacity of a small cell of the respective small cells that has been presumed to have been placed at the candidate location, and determines estimated signal strengths of respective signals that have been predicted to have been received from the small cell at respective portions of a grid of a defined signal coverage area corresponding to the candidate location.

20 Claims, 11 Drawing Sheets

(56) References Cited

U.S. PATENT DOCUMENTS

| | | | |
|---|---|---|---|
| 2019/0116505 A1* | 4/2019 | Bhorkar | G06Q 50/01 |
| 2020/0005523 A1* | 1/2020 | Brebner | H04W 4/33 |
| 2020/0053591 A1* | 2/2020 | Prasad | G06N 3/0445 |
| 2020/0318983 A1* | 10/2020 | Shirani-Mehr | G06V 20/56 |

* cited by examiner

PREDICTING SMALL CELL CAPACITY AND COVERAGE TO FACILITATE OFFLOADING OF MACROCELL CAPACITY

TECHNICAL FIELD

The subject disclosure generally relates to embodiments for predicting small cell capacity and coverage to facilitate offloading of macrocell capacity.

BACKGROUND

Conventional wireless technologies have faced obstacles in meeting the exponential growth in demand for wireless access. For example, increasing an amount of macrocells within a city to improve wireless coverage has been limited due to macrocell tower cost and/or macrocell tower size restrictions. In addition, use of existing macrocell radio frequency (RF) spectrum to accommodate the increased demand for wireless resources is limited by "spectrum exhaust"—a reduction in the available bandwidth of an existing licensed RF spectrum utilized by the macrocell. Further, procuring additional spectrum has been undoable due to the lack of availability and/or cost of such spectrum.

Consequently, conventional cellular technologies have had some drawbacks with respect to accommodating the demand for wireless access, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
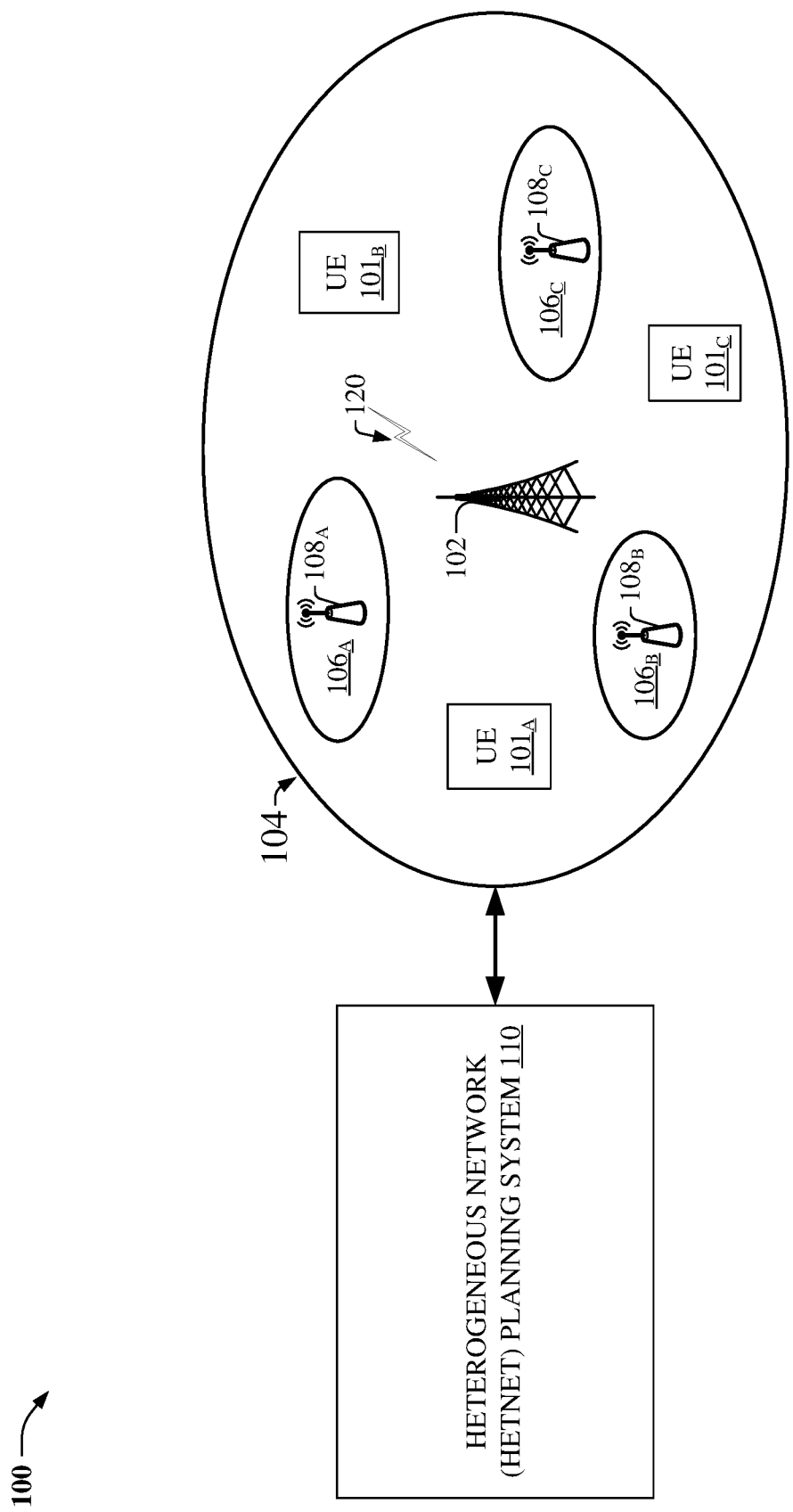
FIG. 1 illustrates a block diagram of a cellular network comprising a heterogeneous network (HetNet) planning system for predicting small cell capacity and coverage to facilitate offloading of macrocell capacity, in accordance with various example embodiments.
Figure 2:
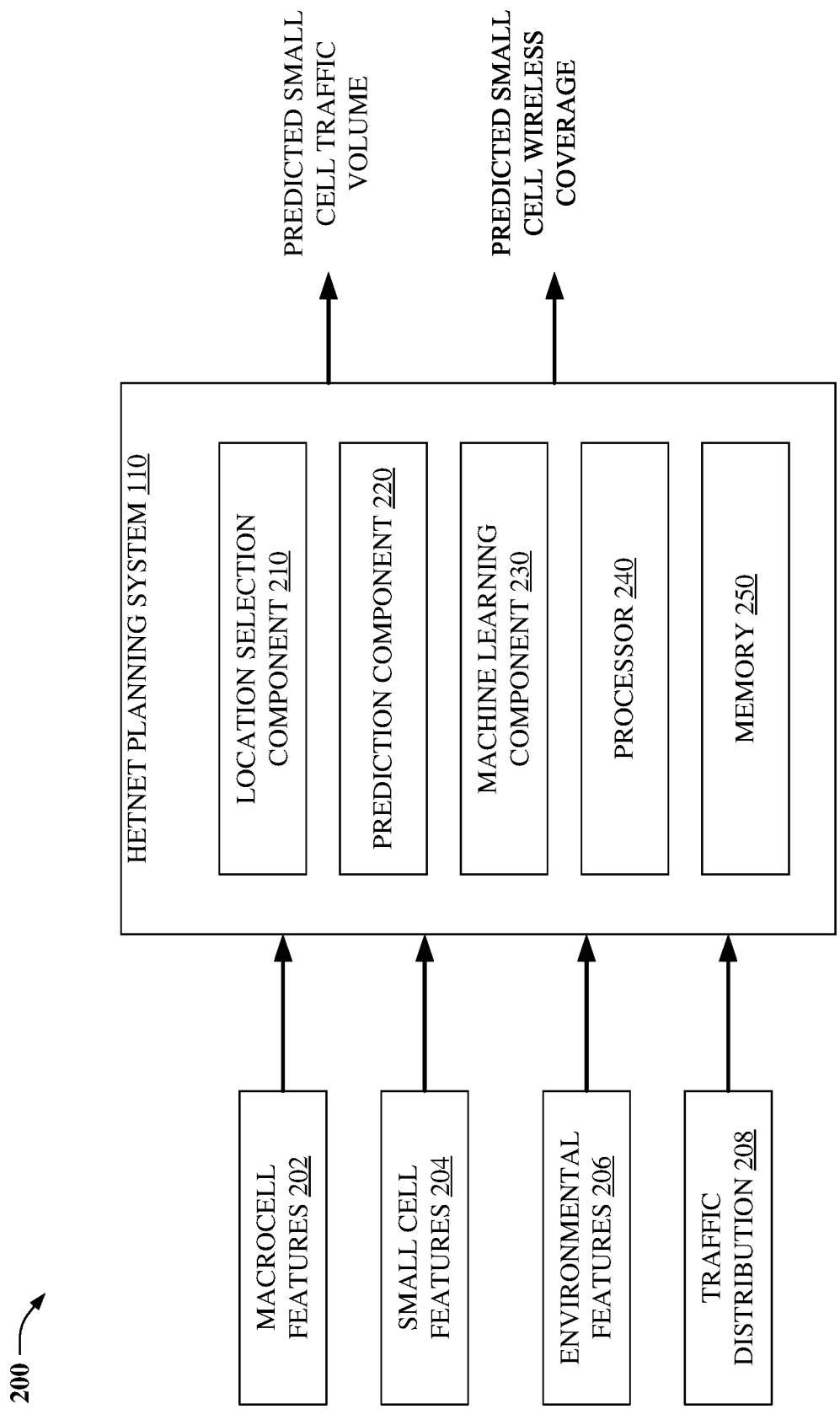
FIG. 2 illustrates a block diagram of a HetNet planning system for predicting small cell capacity and coverage to facilitate offloading of macrocell capacity, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional wireless technologies have had some drawbacks with respect to meeting the demand for wireless access, e.g., due to macrocell size, marocell cost, the limited availability of licensed RF spectrum, etc. Various embodiments disclosed herein can improve wireless access by facilitating offloading, via use of small cells, of macrocell capacity, e.g., within a centralized radio access network (C-RAN) environment, by automatically predicting small cell capacity and coverage within a defined geographic region comprising macrocell(s), e.g., city, region, etc.

For example, in embodiment(s), a system comprises a processor and a memory that stores executable instructions that, when executed by the processor, facilitate performance of operations by the processor, comprising: selecting a group of candidate locations for placement of respective small cells to facilitate offloading, via the respective small cells, of traffic from respective macrocells corresponding to the candidate locations, wherein the respective small cells comprise first transmission powers that are less than second transmission powers of the respective macrocells; and for each candidate location of the group of candidate locations, determining an estimated amount of traffic capacity of a small cell of the respective small cells that has been presumed to have been placed at the candidate location, and determining estimated signal strengths of respective signals that have been predicted to have been received from the small cell at respective portions of a grid of a defined signal coverage area corresponding to the candidate location.

In an embodiment, the operations further comprise: utilizing at least one machine learning model to perform the selecting of the group of candidate locations, the determining of the estimated amount of traffic capacity, and the determining of the estimated signal strengths.

In one embodiment, the utilizing comprises: selecting the machine learning model from a group of machine learning models, the group comprising a decision tree based learning model, a linear regression based learning model, and a Bayesian based learning model.

In an embodiment, the operations further comprise: determining a number of hyperparameters for the machine learning model based on a defined accuracy with respect to at least one of the estimated amount of traffic capacity or the estimated signal strengths.

In another embodiment, the determining of the number of hyperparameters comprises: performing a binary search with respect to determining a number of nodes of a decision tree corresponding to the machine learning model.

In yet another embodiment, the operations further comprise: updating the machine learning model using signal strength measurements that have been obtained from user equipment that have been communicatively coupled to the respective macrocells.

In an embodiment, the selecting of the group of candidate locations comprises: selecting the candidate location based on at least one of: a signal quality of a macrocell of the respective macrocells corresponding to the candidate location, an amount of the traffic communicated by the macrocell over a defined period of time, or a number of user equipment that have been determined to be communicatively coupled to the macrocell over a defined time period.

In one embodiment, the determining of the estimated amount of traffic capacity of the small cell comprises: determining a predicted amount of megabytes to be transmitted via a downlink channel of the small cell over a defined period of time.

In another embodiment, the determining of the estimated amount of traffic capacity of the small cell comprises: determining a group of macrocell characteristics of a macrocell of the respective macrocells corresponding to the candidate location; determining a group of small cell characteristics of the small cell; determining a group of location characteristics corresponding to the candidate location; determining a traffic distribution of user equipment corresponding to the candidate location; and based on the group of macrocell characteristics, the group of small cell characteristics, the group of environmental characteristics, and the traffic distribution of user equipment, determining the estimated amount of traffic capacity of the small cell.

In yet another embodiment, the group of macrocell characteristics comprises: at least one of a reference signal receive power corresponding to the macrocell, a reference signal received quality corresponding to the macrocell, or an amount of megabytes that have been transmitted via a downlink channel of the macrocell over a defined period of time.

In an embodiment, the group of small cell characteristics comprises: at least one of an installation height of the small cell, a transmission power of the small cell, an antenna model of the small cell, or a period of deployment of the small cell.

In one embodiment, the group of location characteristics comprises: at least one of a line of sight percentage of the defined signal coverage area that has been determined to be within a line of site of the small cell, an indoor location percentage of the defined signal coverage area that has been determined to be located within a building or structure, or a pedestrian traffic percentage of pedestrian traffic that has been determined to correspond to the defined signal coverage area.

In another embodiment, the traffic distribution of user equipment comprises a number of the user equipment that have been determined to have been located in the defined signal coverage area over a defined period of time.

In yet another embodiment, the determining the estimated signal strengths comprises: determining a group of small cell characteristics of the small cell; determining a group of location features corresponding to the small cell and the respective portions of the defined signal coverage area; and based on the group of small cell characteristics and the group of location features, determining the estimated signal strength.

In an embodiment, the group of small cell characteristics comprises: at least one of an installation height of the small cell, a transmission power of the small cell, an antenna tilt of the small cell, a width of transmission of a beam from the small cell, or a frequency band of the transmission of the beam.

In another embodiment, the group of location features comprises: at least one of a distance between the small cell and a portion of the respective portions of the defined signal coverage area, a difference between a bearing angle of a predicted transmission of a beam that has been predicted to have been transmitted by the small cell from the candidate location and a reception angle of a predicted reception of the beam at the portion of the defined signal coverage area, or a path characteristic of a transmission path between the small cell and the portion of the defined signal coverage area.

In an embodiment, a method comprises: assigning, by a system comprising a processor, wireless coverage regions to respective candidate locations to facilitate offloading, via projected placement of small cells at the respective locations, of wireless capacity of macrocells corresponding to the wireless coverage regions; dividing, by the system, the respective wireless coverage regions into respective groups of wireless coverage areas; and predicting, by the system, respective wireless bandwidth capacities of the small cells and received signal strengths of respective beams that have been projected to have been received, from the small cells, at the wireless coverage areas.

In one embodiment, predicting the respective wireless bandwidth capacities comprises predicting the respective wireless bandwidth capacities of the small cells based on a group of macrocell characteristics of the macrocells, a first group of small cell characteristics of the small cells, a first group of location characteristics corresponding to the respective candidate locations, and traffic distributions of respective mobile devices corresponding to the respective candidate locations, and wherein predicting the received signal strengths comprises predicting the received signal strengths of the respective beams at the wireless coverage areas based on a second group of small cell characteristics of the small cells and a second group of location characteristics corresponding to the small cells and the respective groups of wireless coverage areas.

In another embodiment, a non-transitory machine-readable medium, comprising executable instructions that, when executed by network equipment comprising a processor, facilitate performance of operations, comprising: determining a group of respective candidate locations for placement of respective small cells to facilitate respective reductions of traffic of macrocells corresponding to the respective candidate locations; and based on the respective candidate locations, determining traffic volumes of the respective small cells and radio propagation characteristics of respective beams that have been projected to have been received, from the respective small cells, at portions of respective grids of coverage areas corresponding to the respective candidate locations.

In yet another embodiment, determining the traffic volumes is based on respective macrocell characteristics of the macrocells, first small cell characteristics of the respective small cells, first location features corresponding to the respective candidate locations, and traffic distributions of respective mobile devices corresponding to the respective candidate locations, and wherein determining the radio propagation characteristics is based on second small cell characteristics of the respective small cells and second location features corresponding to the portions of the respective grids of coverage areas.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As described above, conventional wireless technologies have faced obstacles in meeting the exponential growth in demand for wireless access. In this regard, further deployment of macrocells within cities to meet such demand has been limited due to macrocell tower cost, antenna size restrictions, weight restrictions, etc., e.g., corresponding to rooftop placement on city buildings. Further, use of existing macrocell RF spectrum to accommodate for such growth has been limited by spectrum exhaust, and availability of additional spectrum is cost prohibitive or nonexistant.

Now referring to FIGS. 1-4, a block diagram of a cellular network comprising a HetNet planning system (110) for predicting small cell capacity and coverage to facilitate offloading of macrocell capacity, and block diagrams of the HetNet planning system, a location selection component (210) of the HetNet planning system, and a prediction component (220) of the HetNet planning system are illustrated, respectively, in accordance with various example embodiments.

Figure 3:
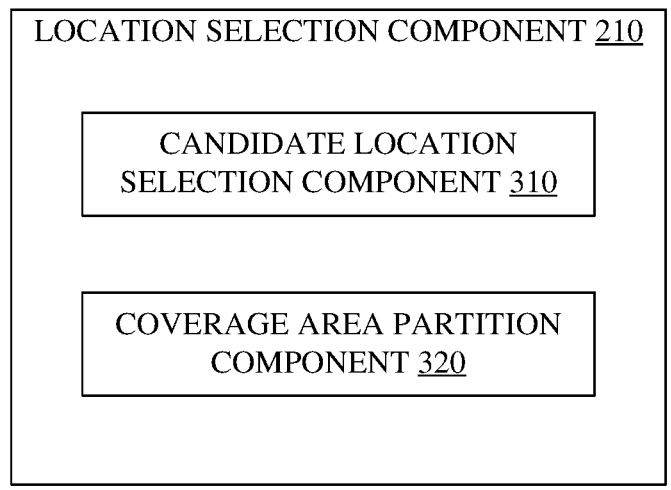
FIG. 3 illustrates a block diagram of a location selection component of a HetNet planning system that facilitates offloading of macrocell capacity, in accordance with various example embodiments.

As illustrated by FIG. 3, the location selection component comprises a candidate location selection component (310) and a coverage area partition component (320). The candidate location selection component selects a group of candidate locations for placement of respective small cells (e.g., $108_A$, $108_B$, $108_C$) (e.g., c-RAN based cell, femtocell, picocell) within a wireless coverage area (104) of a macrocell (102) (e.g., a base station device, wireless access point (AP), eNodeB (eNB)) to facilitate offloading, via the respective small cells, of traffic from the macrocell—the macrocell having an antenna footprint that is larger than an antenna footprint of a small cell, and the macrocell having a transmission power that is order(s) of magnitude greater than a transmission power of the small cell.

In embodiment(s), the candidate location selection component selects a candidate location of the group of candidate locations based on macrocell features (202) of the macrocell including a signal quality of the macrocell, an amount of traffic communicated by the macrocell over a defined period of time, e.g., month, a number of user equipment (e.g., $101_A$, $101_B$, $101_C$) that have been determined to be communicatively coupled to the macrocell over the defined time period, etc.

In other embodiment(s), the coverage area partition component divides a wireless coverage area (e.g., 104) of the macrocell into wireless coverage regions, defined signal coverage areas, etc. (e.g., $106_A$, $106_B$, $106_C$) corresponding to the group of candidate locations. In turn, the coverage area partition component further divides the wireless coverage regions, etc. into respective grids (not shown), e.g., dividing a wireless coverage region into a grid having portions of coverage areas.

Figure 4:
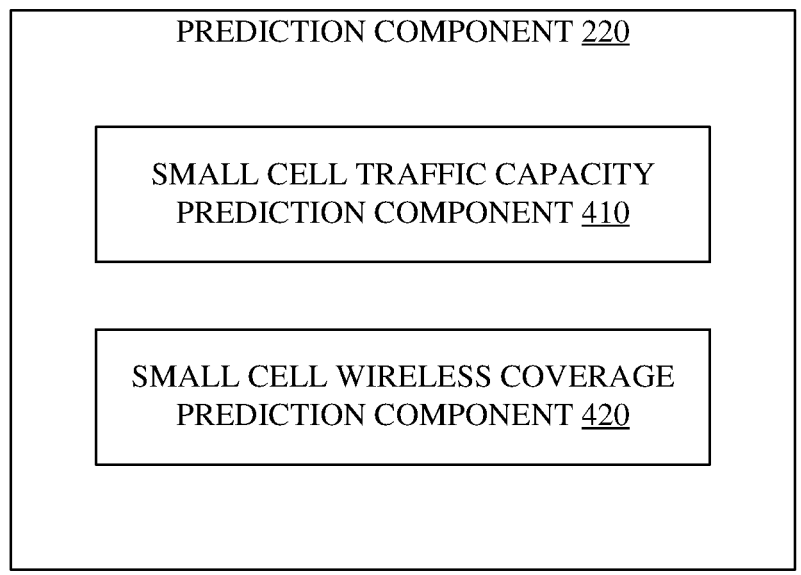
FIG. 4 illustrates a block diagram of a prediction component of a HetNet planning system that facilitates offloading of macrocell capacity, in accordance with various example embodiments.

As illustrated by FIG. 4, the prediction component comprises a small cell traffic capacity prediction component (410) and a small cell wireless coverage prediction component (420). The small cell traffic capacity prediction component determines, for each candidate location of the group of candidate locations, an estimated amount of traffic capacity of a small cell of the respective small cells that has been presumed to have been placed at the candidate location. Further, the small cell wireless coverage prediction component determines estimated signal strengths of respective wireless signals that have been predicted to have been received from the small cell at respective portions of a grid (not shown) of a wireless coverage region (e.g., $106_A$, $106_B$, $106_C$) corresponding to the candidate location.

Figure 5:
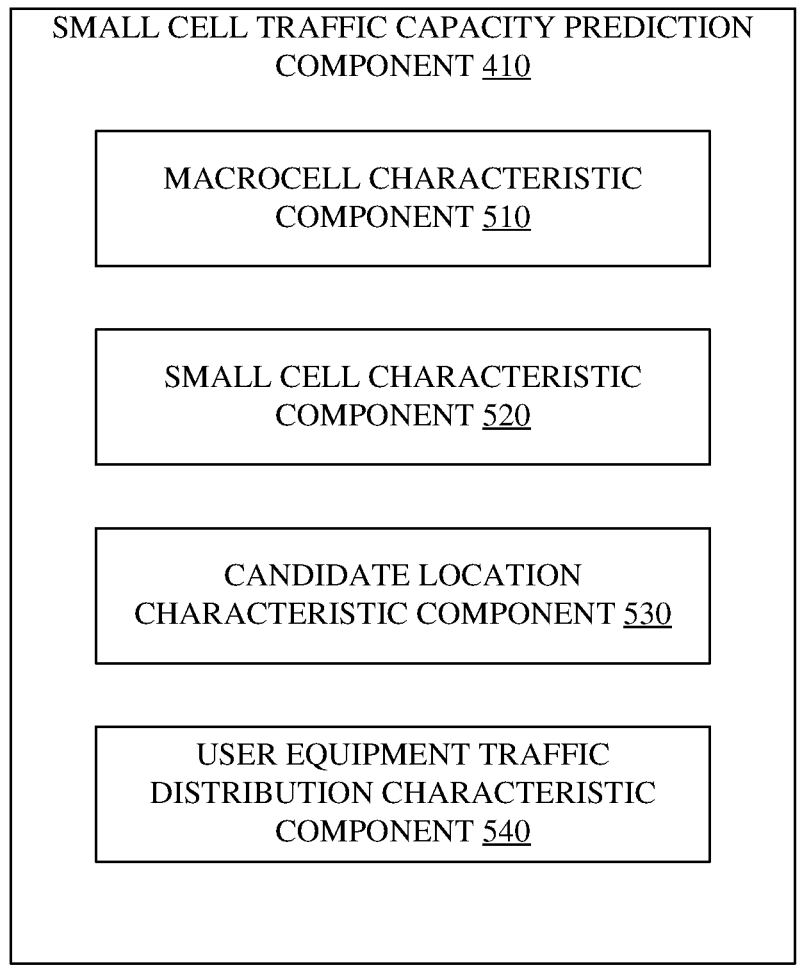
FIG. 5 illustrates a block diagram of a small cell traffic capacity prediction component that facilitates offloading of macrocell capacity, in accordance with various example embodiments.

Referring now to FIG. 5, in embodiment(s), the small cell traffic capacity prediction component comprises a macrocell characteristic component (510), a small cell characteristic component (520), a candidate location characteristic component (530), and a user equipment traffic distribution characteristic component (540). The macrocell characteristic component can receive, determine, obtain, etc. a group of macrocell characteristics, features, etc. (202) of a macrocell of the respective macrocells corresponding to the candidate location. In embodiment(s), the group of macrocell characteristics comprises a reference signal receive power (RSRP) corresponding to the macrocell, a reference signal received quality (RSRQ) corresponding to the macrocell, and/or an amount of megabytes that have been transmitted via a downlink channel of the macrocell over a defined period of time.

The small cell characteristic component can determine a predicted amount of megabytes to be transmitted via a downlink channel of the small cell over a defined period of time. In embodiment(s), the small cell characteristic component can receive, determine, obtain, etc. a group of small cell characteristics, features, etc. (204) of the small cell. In embodiment(s), the group of small cell characteristics comprises an installation height of the small cell, a transmission power of the small cell, an antenna model of the small cell, and/or a period of deployment of the small cell.

The candidate location characteristic component can receive, determine, obtain, etc. a group of location, environmental, etc. characteristics, features, etc. (206) corresponding to the candidate location. In embodiment(s), the group of location characteristics comprises a line of sight percentage of the defined signal coverage area that has been determined to be within a line of site of the small cell, an indoor location percentage of the defined signal coverage area that has been determined to be located within a building or structure, and/or a pedestrian traffic percentage of pedestrian traffic that has been determined to correspond to the defined signal coverage area.

The user equipment traffic distribution characteristic component can receive, determine, obtain, etc. a traffic distribution (208) of user equipment corresponding to the candidate location. In embodiment(s), the traffic distribution of user equipment comprises a number of the user equipment that have been determined to have been located in the wireless coverage region over a defined period of time, e.g., month.

In turn, based on the group of macrocell characteristics, the group of small cell characteristics, the group of location characteristics, and the traffic distribution of user equipment, the small cell traffic capacity prediction component can determine the estimated amount of traffic capacity of the small cell.

Figure 6:
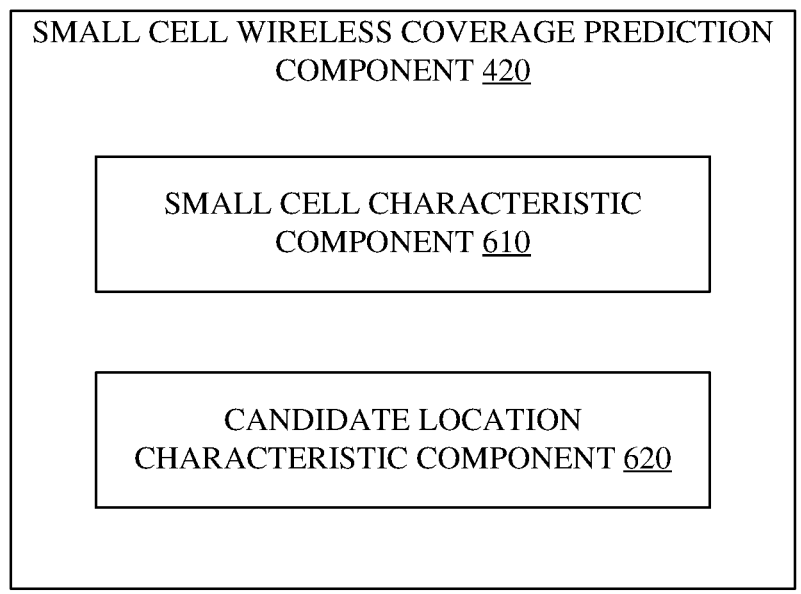
FIG. 6 illustrates a block diagram of a small cell wireless coverage prediction component that facilitates offloading of macrocell capacity, in accordance with various example embodiments.

Now referring to FIG. 6, in embodiment(s), the small cell wireless coverage prediction component comprises a small cell characteristic component (610) and a candidate location characteristic component (620). The small cell characteristic component can determine a group of small characteristics of the small cell. In embodiment(s), the group of small cell characteristics includes an installation height of the small cell, a transmission power of the small cell, an antenna tilt of the small cell, a width of transmission of a beam from the small cell, and/or a frequency band of the transmission of the beam.

The candidate location characteristic component can determine a group of location features corresponding to the small cell and the respective portions of the grid of the wireless coverage region. In embodiment(s), the group of location features includes a distance between the small cell and a portion of the respective portions of the defined signal coverage area, a difference between a bearing angle of a predicted transmission of a beam that has been predicted to have been transmitted by the small cell from the candidate location and a reception angle of a predicted reception of the beam at the portion of the defined signal coverage area, and/or a path characteristic of a transmission path between the small cell and the portion of the defined signal coverage area.

In turn, based on the group of small characteristics and the group of location features, the small cell wireless coverage prediction component can determine the estimated signal strengths of the respective signals that have been predicted to have been received from the small cell at the respective portions of the grid of the wireless coverage region.

Returning now to FIG. 2, the HetNet planning system can include a machine learning component (230) to facilitate, utilizing machine learning model(s), selection of the group of candidate locations, determination of the estimated amount of traffic capacity of the small cell, and/or determination of the estimated signal strengths of the respective signals that have been predicted to have been received from the small cell at the respective portions of the grid of the wireless coverage region.

Figure 7:
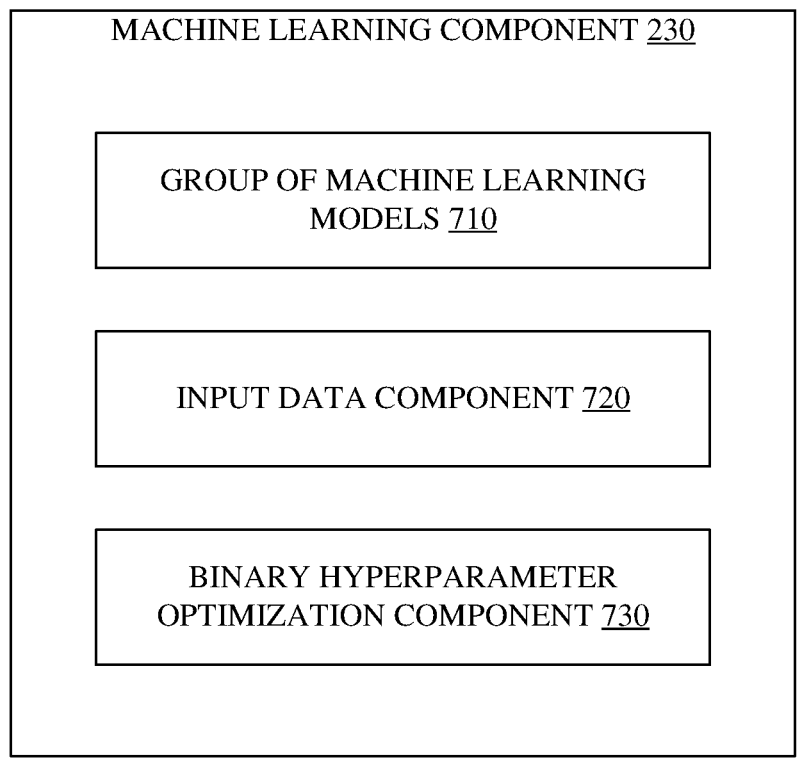
FIG. 7 illustrates a block diagram of a machine learning component of a HetNet planning system that facilitates offloading of macrocell capacity, in accordance with various example embodiments.

In this regard, and now referring to FIG. 7, in embodiment(s), the machine learning component can comprise a group of machine learning models (710) including a decision tree based learning model, a linear regression based learning model, and a Bayesian based learning model.

Further, the machine learning component can include a binary hyperparameter optimization component (730) that can determine, based on a defined accuracy with respect the estimated amount of traffic capacity of the small call and/or the estimated signal strengths of the respective signals that have been predicted to have been received from the small cell at the respective portions of the grid of the wireless coverage region, a number of hyperparameters, e.g., a number of layers, nodes, etc. of a decision tree, for a machine learning model of the group of machine learning models.

In embodiment(s), the binary hyperparameter optimization component can determine the number of hyperparameters by performing a binary search with respect to determining the number of layers, nodes, etc. of the decision tree, e.g., iteratively narrowing down the number of layers, nodes, etc. of the decision tree until the estimated amount of traffic capacity and/or the estimated signal strengths has been determined to be within the defined accuracy.

In other embodiment(s), an input data component (720) of the machine learning component can update the machine learning model using signal strength measurements, e.g., RSRP, RSRQ, etc. that have been obtained from user equipment (e.g., $101_A$, $101_B$, $101_C$) communicatively coupled to the respective macrocells.

Figure 8:
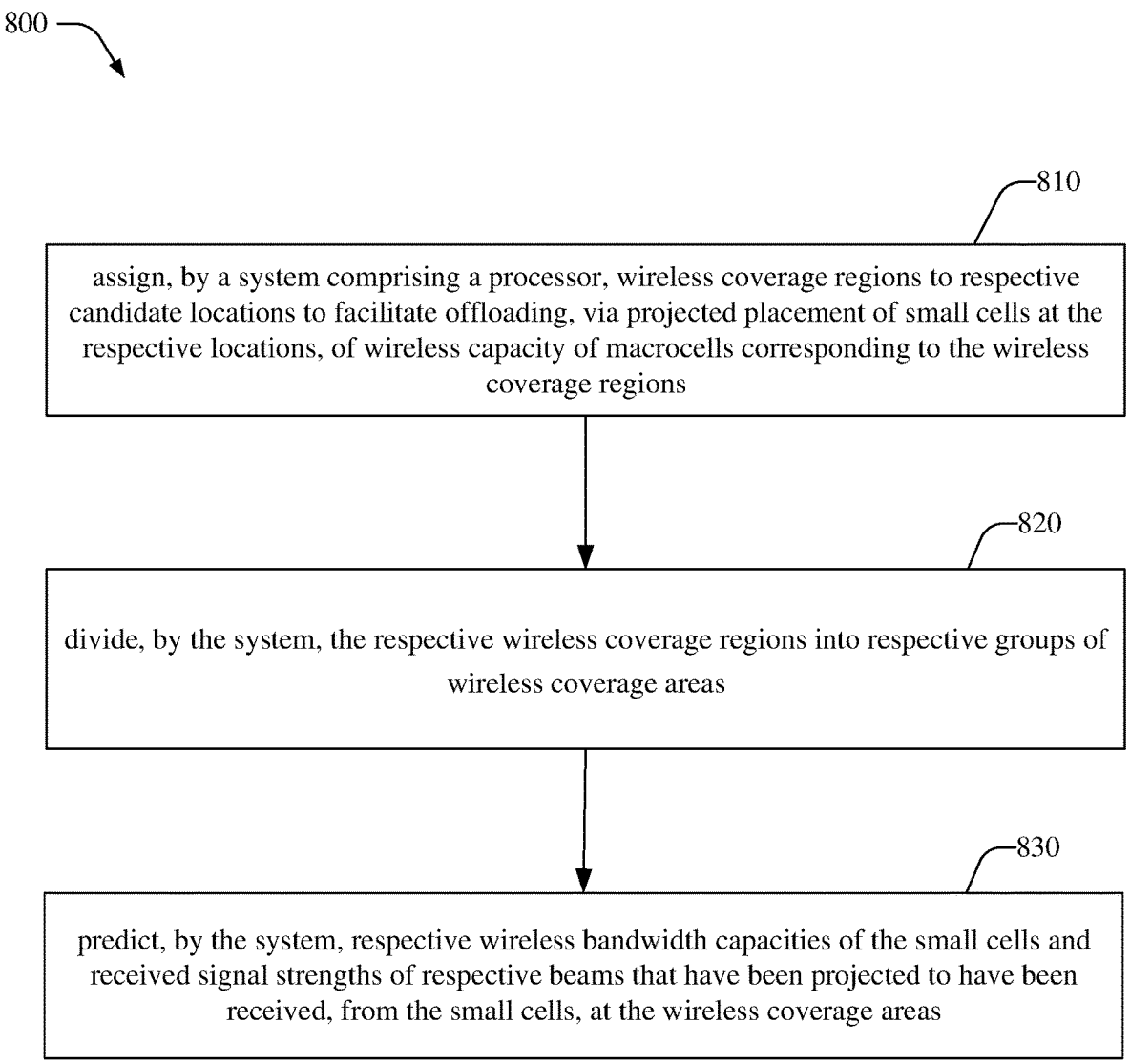
FIG. 8 illustrates a flow chart of a method associated with predicting small cell capacity and coverage to facilitate offloading of macrocell capacity, in accordance with various example embodiments.
Figure 9:
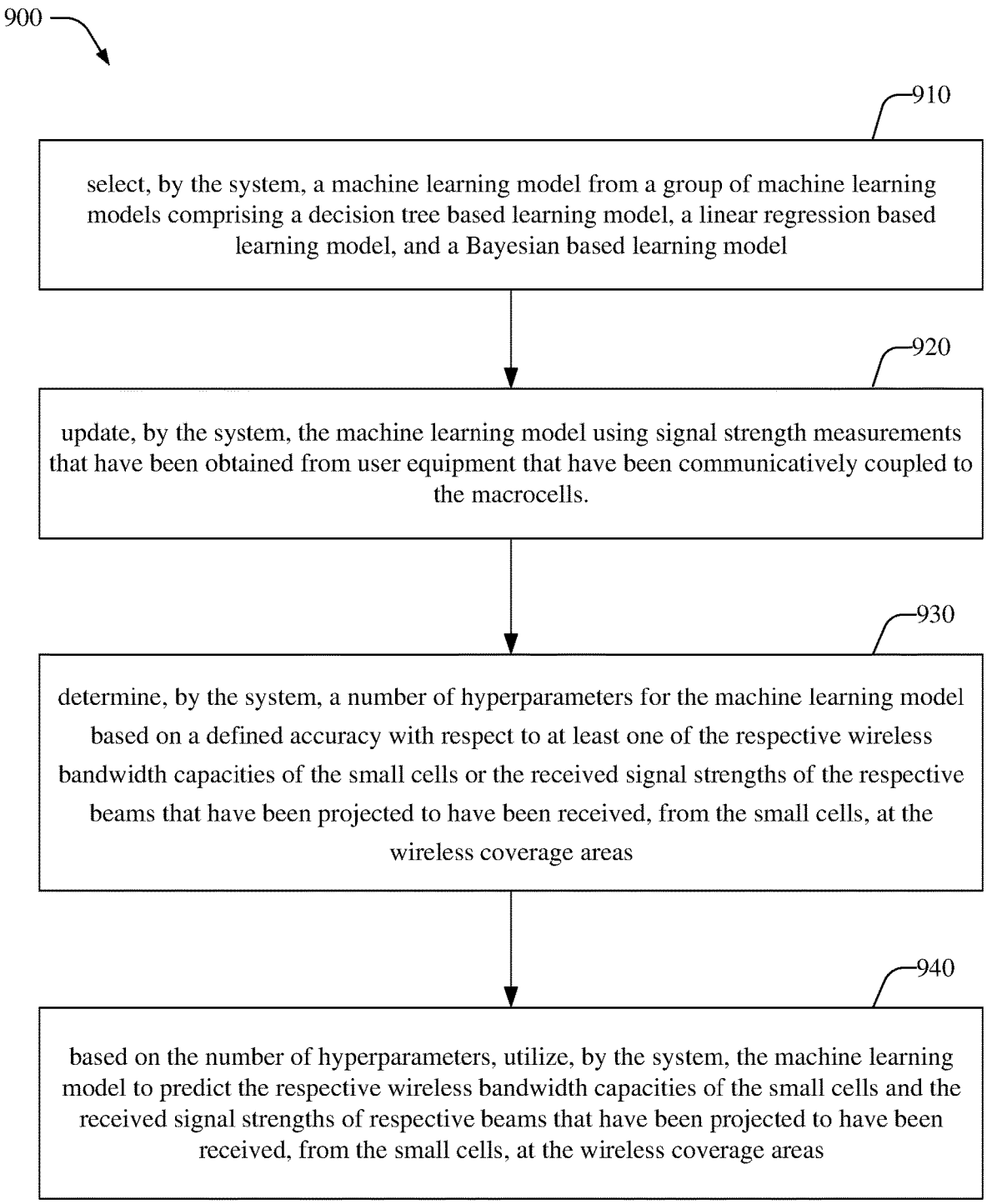
FIG. 9 illustrates a flow chart of another method associated with predicting small cell capacity and coverage to facilitate offloading of macrocell capacity, in accordance with various example embodiments.

FIGS. 8-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 8, a flowchart of a method (800) associated with predicting small cell capacity and coverage to facilitate offloading of macrocell capacity, is illustrated, in accordance with various example embodiments. At 810, a system (110) assigns wireless coverage regions to respective candidate locations to facilitate offloading, via projected placement of small cells at the respective locations, of wireless capacity of macrocells corresponding to the wireless coverage regions At 820, the system divides, e.g., via a grid, the respective wireless coverage regions into respective groups of wireless coverage areas. At 830, the system predicts respective wireless bandwidth capacities of the small cells and received signal strengths of respective beams that have been projected to have been received, from the small cells, at the wireless coverage areas.

FIG. 9 illustrates a flowchart of a method (900) associated with predicting, utilizing machine learning model(s), small cell capacity and coverage to facilitate offloading of macrocell capacity, in accordance with various example embodiments. At 910, a system (110), selects a machine learning model from a group of machine learning models comprising a decision tree based learning model, a linear regression based learning model, and a Bayesian based learning model.

At 920, the system updates the machine learning model using signal strength measurements, e.g., RSRP, RSRQ, etc. that have been obtained from user equipment that have been communicatively coupled to the macrocells.

At 930, the system determines a number of hyperparameters for the machine learning model based on a defined accuracy with respect to the respective wireless bandwidth capacities of the small cells and/or the received signal strengths of the respective beams that have been projected to have been received, from the small cells, at the wireless coverage areas.

At 940, based on the number of hyperparameters, the system utilizes the machine learning model to predict the respective wireless bandwidth capacities of the small cells and the received signal strengths of respective beams that have been projected to have been received, from the small cells, at the wireless coverage areas.

Figure 10:
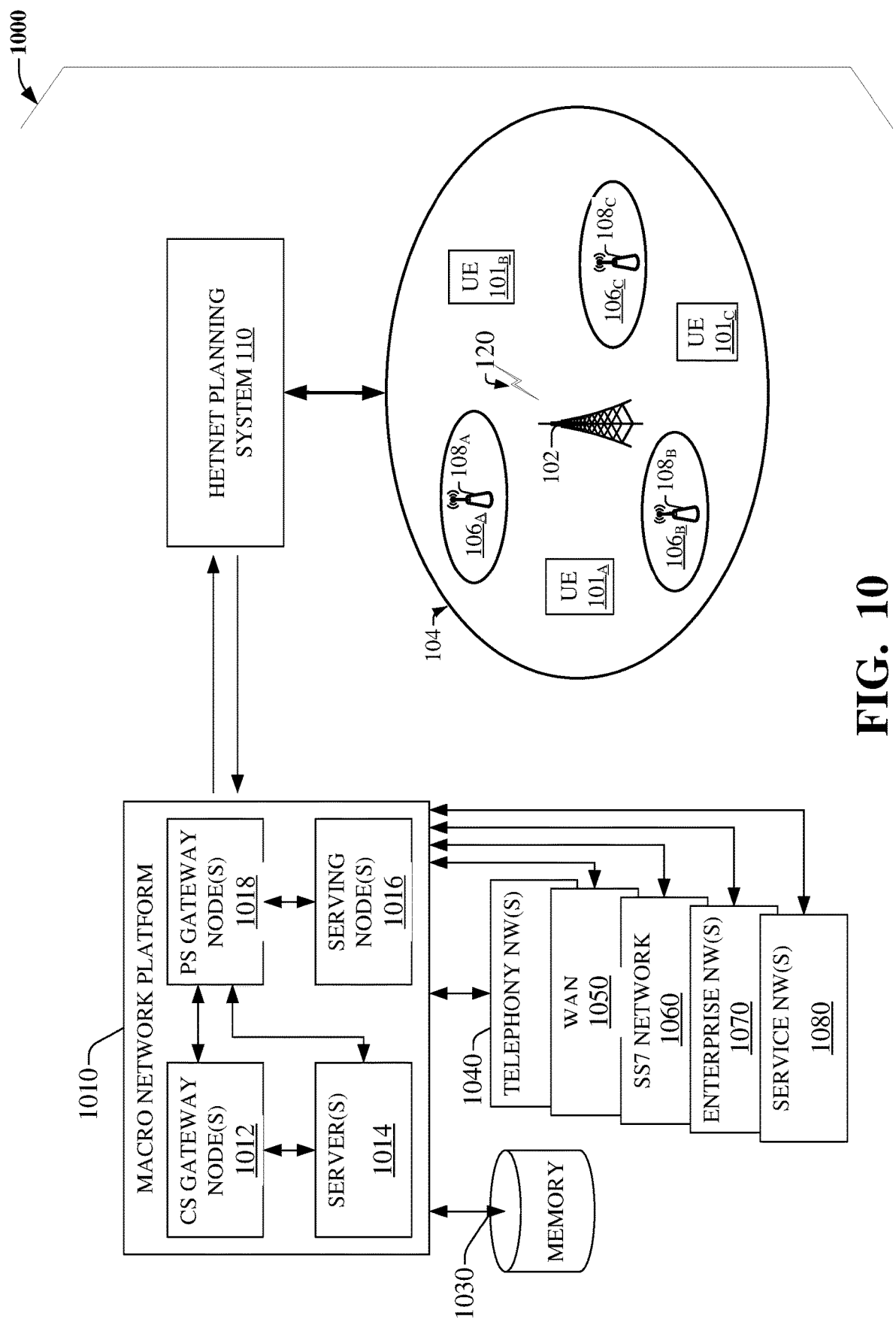
FIG. 10 illustrates a block diagram of a wireless network environment, in accordance various example embodiments.

FIG. 10 illustrates a wireless communication environment 10000 including macro network platform 1010 is illustrated, in accordance with various embodiments. Macro network platform 1010 serves or facilitates communication with a device (e.g., 101$_A$, 101$_B$, 101$_C$) via a cellular network (100). It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, 5G, etc. that can be associated with the cellular system, macro network platform 1010 can be embodied in a core network. It is noted that the cellular system can include base station(s), base transceiver station(s), access point(s), macrocells, small cell(s), (e.g., 102, 108$_A$, 108$_B$, 108$_C$) and associated electronic circuitry and deployment site(s), in addition to a wireless radio link (120) operated in accordance with the base station(s), etc. Accordingly, the cellular system can comprise various coverage cells, or wireless coverage areas. In addition, it should be appreciated that elements and/or components, e.g., of the cellular system, can be located/included within one or more components/elements, e.g., hardware, software, etc., of wireless communication environment 1000, e.g., macro network platform 1010, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signaling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via the cellular system, with served devices, communication devices, etc. Such data sessions can include traffic exchange with networks external to macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of a base station device, etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via the cellular system; and so forth. Memory 1030 can also store information from at least one of telephony network(s) 1040, WAN 1050, SS7 network 1060, enterprise NW(s) 1070, or service NW(s) 1080.

In one or more embodiments, components of wireless communication environment 1000 can provide communication services to the device utilizing an over-the-air wireless link (e.g., 120) via the cellular system. In this regard, the cellular system can include one or more: macro, Femto, or pico access points (APs) (not shown); base stations (BS); landline networks (e.g., optical landline networks, electrical landline networks) (not shown) communicatively coupled between the device and macro network platform 1010, etc.

Wireless communication environment 1000 can include one or more of the Internet (or another communication network (e.g., IP-based network)), or DSL-type or broadband network facilitated by Ethernet or other technology. In various embodiments, wireless communication environment 1000 can include hardware and/or software for allocating resources to the device and the cellular system, converting or enforcing protocols, establishing and/or providing levels of quality of service (QoS), providing applications or services, translating signals, and/or performing other desired functions to facilitate system interoperability and communication to/from the device and the cellular system.

In other embodiment(s), wireless communication environment 1000 can include data store component(s), a memory configured to store information, computer-readable storage media storing computer-executable instructions, e.g., memory 250, memory 1030, etc. enabling various operations performed via the wireless communication environment as described herein.

As it employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store," "memory storage," "memory component", "memory", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 250, memory 1030, system memory 1106 (see below), external storage 1116 (see below), and/or memory storage 1152 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1112) can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
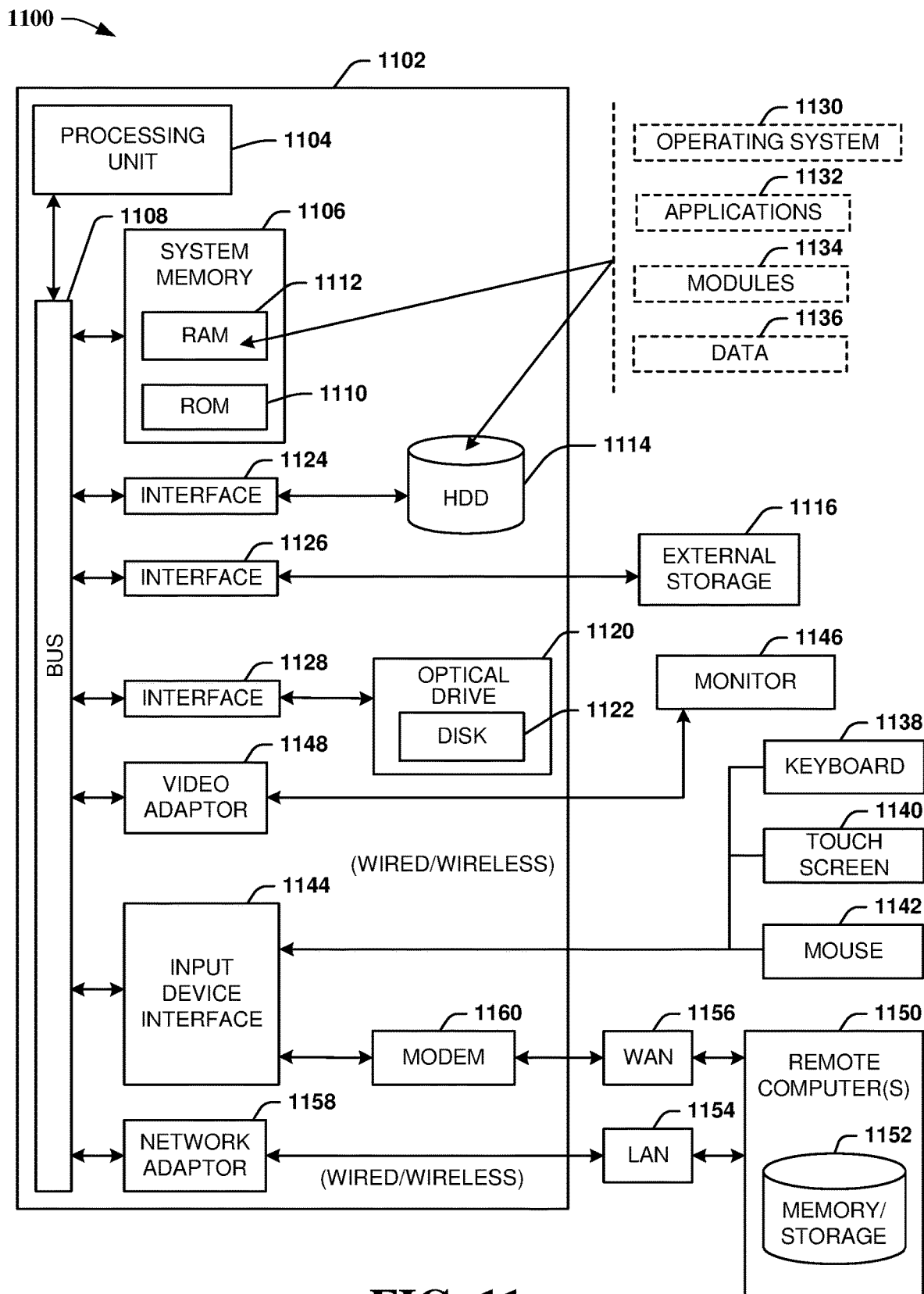
FIG. 11 is a block diagram representing an illustrative non-limiting computing system or operating environment in which one or more aspects of various embodiments described herein can be implemented.

In order to provide additional context for various embodiments described herein, FIG. 11 and the following discussion are intended to provide a brief, general description of a suitable computing environment 11000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/ wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), $x^{th}$ generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a wireless system (see e.g., 100), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless device, e.g., a wireless communication device, a user equipment, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, WiFi phone, a dual-mode cellular/WiFi phone, a combination cellular/VoIP/WiFi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., 110), including but not limited to: selecting a group of candidate locations for placement of respective small cells to facilitate offloading, via the respective small cells, of traffic from respective macrocells corresponding to the candidate locations, wherein the respective small cells comprise first transmission powers that are less than second transmission powers of the respective macrocells; and for each candidate location of the group of candidate locations, determining an estimated amount of traffic capacity of a small cell of the respective small cells that has been presumed to have been placed at the candidate location, and determining estimated signal strengths of respective signals that have been predicted to have been received from the small cell at respective portions of a grid of a defined signal coverage area corresponding to the candidate location A classifier can be a function that maps an input attribute vector, $x=(x1, x2, x3, x4, xn)$, to a confidence that the input belongs to a class, that is, $f(x)=confidence (class)$. Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., a decision tree based learning model, a linear regression based learning model, support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations by the processor, comprising:
   in response to a machine learning model being selected from a group of machine learning models comprising a decision tree based learning model, a linear regression based learning model, and a Bayesian based learning model, selecting, via the machine learning model, a group of candidate locations for placement of respective small cells to facilitate offloading, via the respective small cells, of traffic from respective macrocells corresponding to the candidate locations, wherein the respective small cells comprise first transmission powers that are less than second transmission powers of the respective macrocells; and
   for each candidate location of the group of candidate locations, determining, via the machine learning model, an estimated amount of traffic capacity of a small cell of the respective small cells that has been presumed to have been placed at the candidate location, and estimated signal strengths of respective signals that have been predicted to have been received from the small cell at respective portions of a grid of a defined signal coverage area corresponding to the candidate location, wherein a number of hyperparameters for the machine learning model have been determined based on a defined accuracy with respect to at least one of the estimated amount of traffic capacity or the estimated signal strengths.

2. The system of claim 1, wherein the operations further comprise:
   performing a binary search with respect to determining a number of nodes of a decision tree corresponding to the decision tree machine learning model.

3. The system of claim 1, wherein the operations further comprise:
   updating the machine learning model using signal strength measurements that have been obtained from user equipment that have been communicatively coupled to the respective macrocells.

4. The system of claim 1, wherein selecting the group of candidate locations comprises:
   selecting the candidate location based on:
   a signal quality of a macrocell of the respective macrocells corresponding to the candidate location.

5. The system of claim 1, wherein determining the estimated amount of traffic capacity of the small cell comprises:
   determining a predicted amount of megabytes to be transmitted via a downlink channel of the small cell over a defined period of time.

6. The system of claim 1, wherein determining the estimated amount of traffic capacity of the small cell comprises:
   determining a group of macrocell characteristics of a macrocell of the respective macrocells corresponding to the candidate location;
   determining a group of small cell characteristics of the small cell;
   determining a group of location characteristics corresponding to the candidate location;
   determining a traffic distribution of user equipment corresponding to the candidate location; and
   based on the group of macrocell characteristics, the group of small cell characteristics, the group of environmental characteristics, and the traffic distribution of user equipment, determining the estimated amount of traffic capacity of the small cell.

7. The system of claim 6, wherein the group of macrocell characteristics comprises:
at least one of a reference signal receive power corresponding to the macrocell, a reference signal received quality corresponding to the macrocell, or an amount of megabytes that have been transmitted via a downlink channel of the macrocell over a defined period of time.

8. The system of claim 6, wherein the group of small cell characteristics comprises:
at least one of an installation height of the small cell, a transmission power of the small cell, an antenna model of the small cell, or a period of deployment of the small cell.

9. The system of claim 6, wherein the group of location characteristics comprises:
at least one of a line of sight percentage of the defined signal coverage area that has been determined to be within a line of site of the small cell, an indoor location percentage of the defined signal coverage area that has been determined to be located within a building or structure, or a pedestrian traffic percentage of pedestrian traffic that has been determined to correspond to the defined signal coverage area.

10. The system of claim 6, wherein the traffic distribution of user equipment comprises a number of the user equipment that have been determined to have been located in the defined signal coverage area over a defined period of time.

11. The system of claim 1, wherein the determining of the estimated signal strengths comprises:
determining a group of small characteristics of the small cell;
determining a group of location features corresponding to the small cell and the respective portions of the defined signal coverage area; and
based on the group of small characteristics and the group of location features, determining the estimated signal strength.

12. The system of claim 11, wherein the group of small cell characteristics comprises:
at least one of an installation height of the small cell, a transmission power of the small cell, an antenna tilt of the small cell, a width of transmission of a beam from the small cell, or a frequency band of the transmission of the beam.

13. The system of claim 11, wherein the group of location features comprises:
at least one of a distance between the small cell and a portion of the respective portions of the defined signal coverage area, a difference between a bearing angle of a predicted transmission of a beam that has been predicted to have been transmitted by the small cell from the candidate location and a reception angle of a predicted reception of the beam at the portion of the defined signal coverage area, or a path characteristic of a transmission path between the small cell and the portion of the defined signal coverage area.

14. The system of claim 1, wherein selecting the group of candidate locations comprises:
selecting the candidate location based on an amount of the traffic communicated by the macrocell over a defined period of time.

15. The system of claim 1, wherein selecting the group of candidate locations comprises:
selecting the candidate location based on a number of user equipment that have been determined to be communicatively coupled to the macrocell over the defined time period.

16. A method, comprising:
selecting, by a system comprising a processor, a machine learning model from a group of machine learning models comprising a decision tree based learning model, a linear regression based learning model, and a Bayesian based learning model;
based on the machine learning model, determining, by the system, a group of candidate locations for placement of respective small cells comprising first respective transmission powers that are less than second respective transmission powers of respective macrocells, wherein the placement of the respective small cells facilitates offloading of traffic from the respective macrocells to the respective small cells;
determining, by the system using the machine learning model based on a number of hyperparameters of the machine learning model, an estimated amount of traffic capacity of a small cell of the respective small cells that has been presumed to have been placed at a candidate location of the group of candidate locations, and an estimated signal strengths of respective signals that have been predicted to have been received from the small cell at respective portions of a grid of a defined signal coverage area corresponding to the candidate location; and
based on a defined accuracy with respect to the estimated amount of traffic capacity, determining, by the system, the number of hyperparameters for the machine learning model.

17. The method of claim 16, further comprising:
performing, by the system, a binary search with respect to determining a number of nodes of a decision tree corresponding to the decision tree based machine learning model.

18. The method of claim 16, further comprising:
updating, by the system, the machine learning model using signal strength measurements that have been obtained from user equipment that have been communicatively coupled to the respective macrocells.

19. A non-transitory machine-readable medium, comprising executable instructions that, when executed by network equipment comprising a processor, facilitate performance of operations, comprising:
in response to selecting a machine learning model from a group of machine learning models comprising a decision tree based learning model, a linear regression based learning model, and a Bayesian based learning model, determining, via the machine learning model candidate locations for placement of respective small cells to facilitate respective reductions of traffic of macrocells corresponding to the candidate locations; and
based on the candidate locations, determining, via the group of machine learning models based on a number of hyperparameters of the machine learning models,
an estimated amount of traffic capacity of a small cell of the respective small cells that has been presumed to have been placed at a candidate location of the candidate locations, and
estimated signal strengths of respective signals that have been predicted to have been received from the small cell at respective portions of a grid of a defined signal coverage area corresponding to the candidate location, wherein the number of hyperparameters has been determined based on a defined accuracy with respect to the estimated signal strengths.

20. The non-transitory machine-readable medium of claim 19, wherein determining the estimated amount of traffic capacity of the small cell comprises:

determining a predicted amount of megabytes to be transmitted via a downlink channel of the small cell over a defined period of time.

* * * * *